United States Patent [19]

Schiel

[11] Patent Number: 4,691,421
[45] Date of Patent: Sep. 8, 1987

[54] PRESS ROLL WITH ADJUSTABLE SAG

[75] Inventor: Christian Schiel, Heidenheim, Fed. Rep. of Germany

[73] Assignee: J. M. Voith GmbH', Fed. Rep. of Germany

[21] Appl. No.: 915,724

[22] Filed: Oct. 6, 1986

[30] Foreign Application Priority Data

Jul. 9, 1986 [DE] Fed. Rep. of Germany ....... 3623028

[51] Int. Cl.$^4$ ................. B21B 13/02; B21B 31/32
[52] U.S. Cl. ..................... 29/116 AD; 29/116 R; 29/113 AD; 100/155 R
[58] Field of Search ...... 29/116 AD, 116 R, 113 AD, 29/113 R, 110; 100/155 R, 168, 169

[56] References Cited

U.S. PATENT DOCUMENTS

| | | | |
|---|---|---|---|
| 3,290,897 | 12/1966 | Kuehn | 29/116 AD |
| 3,921,514 | 11/1975 | Biondetti | 29/116 AD |
| 4,000,979 | 1/1977 | Biondetti | 29/116 AD |
| 4,334,344 | 6/1982 | Biondetti | 29/116 AD |
| 4,399,747 | 8/1983 | Schiel et al. | 29/116 AD |

Primary Examiner—Howard N. Goldberg
Assistant Examiner—Irene Graves Golabi
Attorney, Agent, or Firm—Ostrolenk, Faber, Gerb & Soffen

[57] ABSTRACT

A press roll with adjustable sag includes a yoke on stationary flexure girder and a hollow roll shell rotatable around the flexure girder. A hydraulic support device disposed between the flexure girder and the roll shell transmits a pressing force from the flexure girder to the roll shell. An outer gear rim which meshes with a drive pinion is fastened to the roll shell. A gear housing which surrounds the gear rim and the drive pinion, is supported by means of support bearings against the roll shell by a centrally arranged support disk thereof and the support bearings are disposed radially within the outer gear rim on both sides of its support disk. On each side of the outer gear rim, the gear housing is provided with a tubular collar piece on the outside of a support bearing.

20 Claims, 2 Drawing Figures

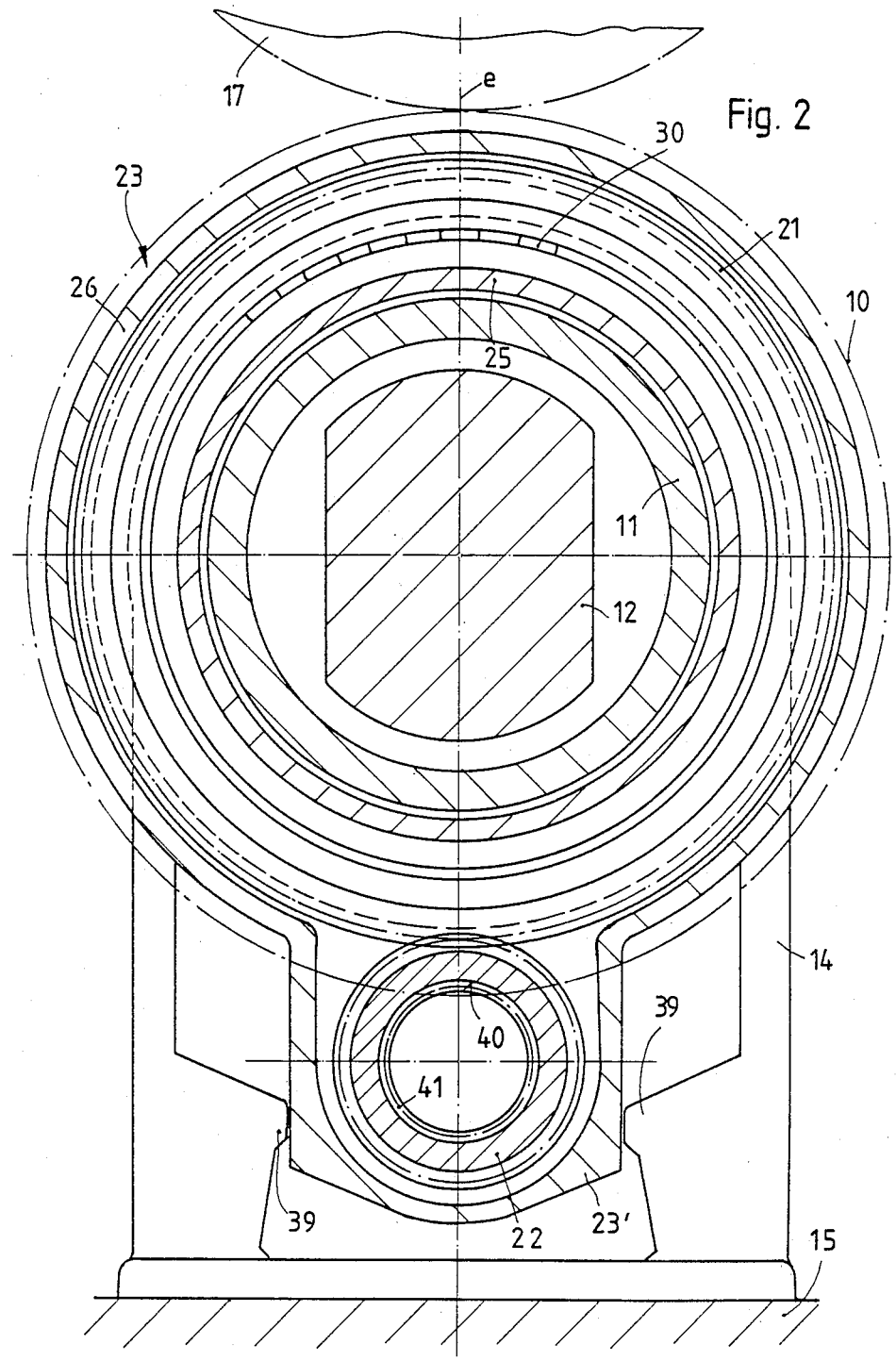

PRESS ROLL WITH ADJUSTABLE SAG

BACKGROUND OF THE INVENTION

The present invention relates generally to long horizontal rolls and relates more particularly to adjustable sag type press rolls that are used in wet presses or calenders of paper machines, as well as machines for the working of other web materials, such as textile webs, plastic sheets or metal foils.

Adjustable sag type press rolls are described in U.S. Pat. No. 3,766,620, issued Oct. 23, 1973 to A.J. Roering for Controlled Deflection Roll Drive and in U.S. Pat. No. 4,000,979, issued June 4, 1977 to M. Biondetti for Roll For a Rolling Mill.

In accordance with U.S. Pat. No. 3,766,620, a roll shell is supported at each end on an extension ring and a self-aligning bearing disposed between the ring and a yoke. The latter extends through the roll shell and rests on a support pedestal. An outer gear rim, machined directly in the outer surface of the extension ring, and a drive pinion in mesh with the gear rim are disposed between the self-aligning bearing and the support pedestal. A gear housing for the pinion and gear rim is supported by a tubular collar piece located within the extension ring of the shell of the roll.

With the construction of U.S. Pat. No. 3,766,620, dimensioning for the seal between the gear housing and extension ring, and the rear bearing (bearing remote from the drive input) on the drive pinion is critical. Proper dimensioning is difficult because this seal and this bearing are positioned substantially in the same transverse plane normal to the roll axis, so that positioning considerations for these two elements often conflict with each other. That prior art construction also suffers from the fact that the self-aligning bearing between the extension and the yoke lies very close to the aforesaid transverse plane. Because of this the diameter of the sliding or working surface of the seal must be greater than the outside diameter of the self-aligning bearing and greater than the outside diameter of the gear rim on the extension ring. As a result, the seal wears relatively rapidly and the outside diameter of the rear bearing for the pinion must be relatively small. Theoretically, it is possible to provide a large rear bearing by enlarging the center-to-center distance between the pinion and gear on the extension ring, but by doing so the gear transmission ratio is reduced. This is undesirable since, as a rule, the highest possible speed of rotation of the pinion is desired.

In the construction of U.S. Pat. No. 4,000,979, the roll shell is mounted at each of its ends on a slotted link which is connected to the yoke in a nonrotatable but radially translatable manner. In this way, it is possible to shift the roll shell by a relatively large amount in a radial direction relative to the yoke, say in order to move the roll shell toward and away from a mating roll. The outer gear rim is developed as an extension ring of the roll shell, and the pinion lies approximately in the same transverse plane as the slotted link. In a similar prior art construction the gears are disposed between the slotted link and the outer support pedestal for the yoke. In both cases, the gear housing is mounted on the outside of the extension ring and extends over both sides of the outer gear rim.

One disadvantage of these slotted link constructions is that the gear housing must have a relatively large axial structural length in the region of the large diameter driven gear. Therefore, if the gearing is arranged between the slotted link and the support pedestal for the yoke, the space available in the axial direction is extremely small. Under certain circumstances it may even be necessary to shift the support pedestal outward and lengthen the yoke accordingly. If the gearing is arranged in the transverse plane of the slotted link, then the radial length of the gear housing necessarily becomes very large in the region of the driven outer gear.

SUMMARY OF THE INVENTION

The press roll construction in accordance with this invention includes an outer driven gear rim and a support bearing for the gear housing that is arranged at a relatively large radial distance from the axis of rotation of the roll shell and thus relatively far from the extension ring of the roll shell. In this way, the outer driven gear rim and the extension ring are separated radially from each other. The gear housing extends toward both sides of the driven gear into spaces disposed radially inward of the outer gear rim. In this way sufficient space remains free between the extension ring and the yoke to permit large radial displacement of the roll shell relative to the yoke when the roll shell is mounted on displaceable slotted links.

This construction also affords more freedom in the selection of the transmission ratio because the outside diameter of the outer driven gear rim can be made relatively large, and because sufficient space is available for relatively large pinion bearings, even if the outside diameter of the pinion is relatively small.

Because the gear-housing support bearing extends radially within the outer driven gear rim, the space required for the gear is very small in the axial direction, so that the supporting pedestal for the equipment can be arranged at a reasonable distance from the end of the roll shell.

Further, this construction provides even more freedom in the selection of the size and arrangement of the sealing ring which must be provided between the gear housing and extension ring. In particular, this sealing ring and the slide surface to be provided for it can be made with a substantially smaller diameter than heretofore so that the life of the seal is considerably increased.

Although the teeth of the outer drive gear rim and the support bearings for the gear housing lie at a relatively large distance from the axis of rotation of the roll shell, it is possible, insofar as the gears are arranged between the roll shell bearing and the supporting pedestal for the yoke, to keep the radial dimension of the gear housing in the region of the outer driven gear rim less than the radial dimension of the roll shell. This is of decisive importance if the radial dimension of the bearing housing for the roll that mates with the roll shell is relatively large. In such case, the press roll of the instant invention can be installed and removed in an axial direction without difficulty, despite the size of the bearing housing of the mating roll.

Teachings of this invention can be employed, regardless of whether the roll shell is mounted directly on the yoke, as in U.S. Pat. No. 3,766,620, or on slotted links which are displaceable radially relative to the yoke, as in U.S. Pat. No. 4,000,979. In both cases radial displacements between the axis of rotation of the roll shell (axis of rotation of the outer driven gear rim) and the axis of the yoke can take place in the transverse central plane of the gearing. When the roll shell is mounted directly on the yoke, radial displacement results essentially only from the fact that the roll shell and the yoke sag to different extents. When the roll shell is mounted on slotted links, radial displacement is substantially greater, corresponding to the displacement path of the slotted links.

There are some press roll constructions, as in U.S. Pat. No. 4,414,890 issued Nov. 15, 1983 to C. Schiel and R. Wolf for Press Roll with Adjustable Flexion, in which the center of the roll shell bearing lies in the central plane of the gearing, so that no substantial radial displacement of the axis of rotation of the roll shell relative to the yoke is possible. Thus, it is not necessary to support the gear housing on the roll shell, so that the gear housing is a part of the stationary supporting pedestal and there is no need to utilize the instant invention.

Accordingly, the primary object of the present invention is to provide a novel press roll construction in which the space required by the gear housing in the region of the outer driven gear rim is relatively small both in the axial and radial directions.

Another object is to provide a novel press roll construction in which it is possible to select a relatively large transmission ratio for the gearing.

Still another object of this invention is to provide a novel press roll construction in which the working seal between the gear housing and the extension ring of the roll shell is arranged on a relatively small diameter so that the danger of premature wear is reduced and the pinion bearing which lies in the same transverse plane can be relatively large.

A further object is to provide a novel press roll construction in which the roll shell is mounted on a slotted link which is displaceable radially relative to the yoke.

BRIEF DESCRIPTION OF THE DRAWINGS

The foregoing objects, as well as other objects of this invention, shall become apparent after reading the following description of the accompanying drawings in which:

FIG. 2 is a cross section along the line II—II of FIG. 1 looking in the direction of arrows II—II.

Figure 1:
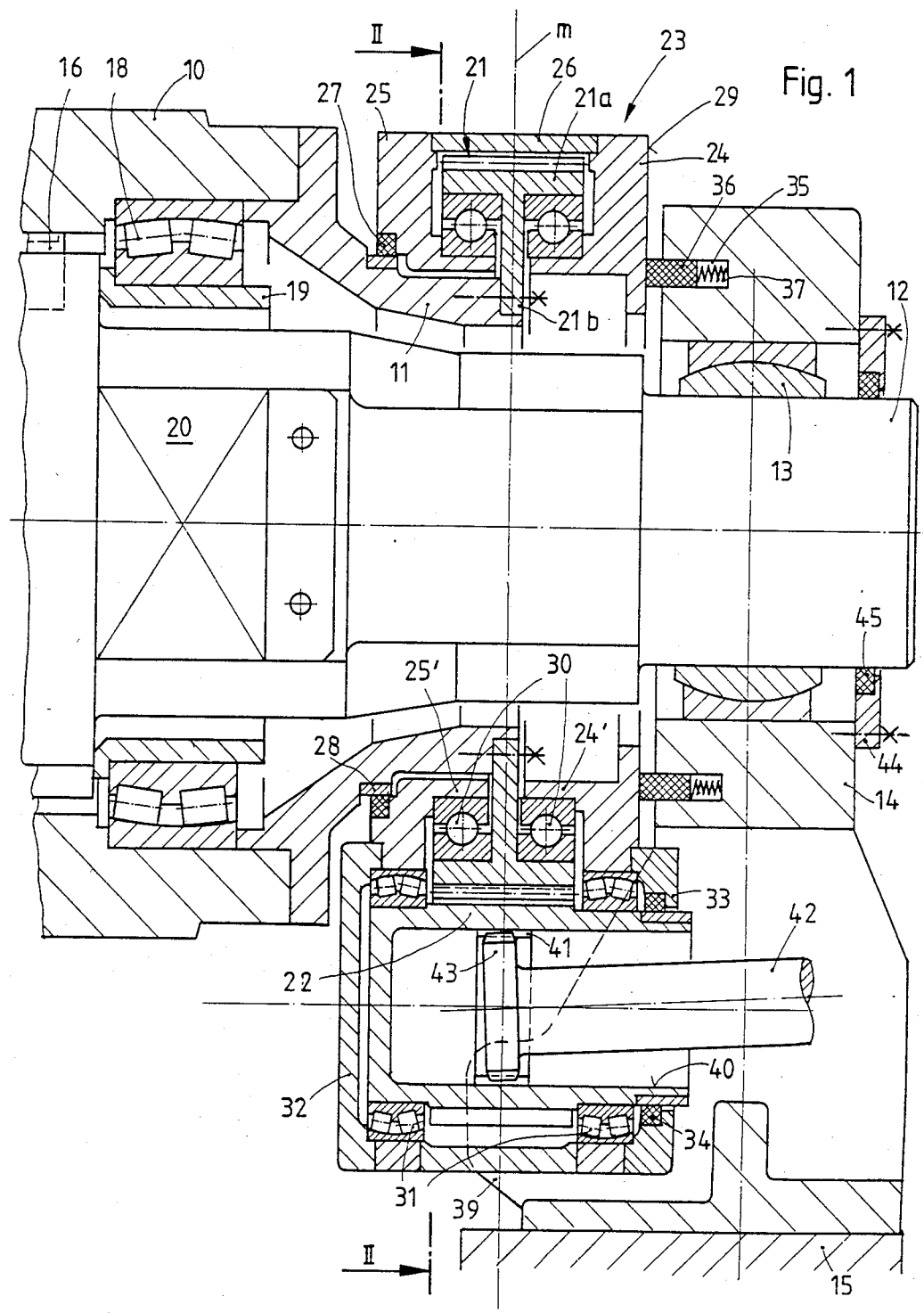
FIG. 1 is a partial longitudinal section in a vertical plane through a press roll in the region of the end of the roll having a gear drive.

DETAILED DESCRIPTION OF THE PREFERRED EMBODIMENT:

Now referring to the drawings wherein the press roll illustrated includes roll shell 10 on the end of which tubular extension piece 11 is fastened. The latter is greatly tapered down relative to the roll shell 10. Stationary flexure or yoke girder 12 extends longitudinally through roll shell 10 and its extension 11, and is mounted by spherical bushing 13 in support pedestal 14 which rests on machine frame 15 that is mounted on a foundation (not shown). In a manner known to the art, yoke 12 is secured against rotation. Hydraulic supporting device 16, disposed between yoke 12 and roll shell 10, transmits a pressing force from yoke 12 to roll shell 10 in press plane e (FIG. 2). In this way, the desired pressing pressure is produced in the press nip between roll shell 10 and mating roll 17 that is partially visible in FIG. 2.

The end of roll shell 10 is mounted by means of self-aligning bearing 18 on a so-called slotted link 19. The latter is displaceable radially relative to yoke 12 being guided by two facing flat slide surfaces 20 which are parallel to the press plane e, and at the same time link 19 is secured against turning. This type of mounting permits roll shell 10 to be lowered and raised along press plane e to move away from and toward mating roll 17 which is mounted in fixed supports (not shown).

Outer driven gear rim 21, concentric to roll shell 10, is secured to the outer end of extension ring 11 and is in mesh with drive pinion 22. Outer gear rim 21 is of T-shaped cross section, and includes horizontal outer ring 21a of substantially rectangular cross section, having gear teeth machined in its outer surface. The other portion of outer gear rim 21 is support disk 21b arranged within outer ring 21a and located substantially centrally with respect to the tooth length thereof. Preferably, parts 21a and 21b is secured at its radially inner region to the end of extension ring 11.

Extension ring 11 and outer gear rim 21a, 21b are so dimensioned that sufficient space is available not only on the front side (to the right in FIG. 1) of the support disk 21 but also on its rear side (to the left in FIG. 1) in order to provide spaces for the sections of an amply dimensioned support bearing 30 for gear housing 23. The sections of bearing 30 are positioned radially within outer ring 21a and on both sides of support disk 21b. Gear housing 23 includes axially spaced end disks 24 and 25, and housing shell 26 clamped between disks 24, 25. These parts 24–26 are shaped to surround outer driven gear rim 21 and drive pinion 22. Each of the disks 24 and 25 includes the respective annular collar pieces 24', 25', each of which mounts a section of support bearing 30.

Drive pinion 22 is a hollow member having concentric bore 40 having internal teeth 41 that cooperate with the outer teeth of disk 43 to form an articulated joint coupling in the region of the central plane of gear wheels 21, 22. Toothed disk 43 is at the rear end of shaft 42 that is rotated by a drive motor (not shown). Teeth 41 and 43 are so developed that the axis of rotation of drive shaft 42 can form an angle with respect to the axis of rotation of pinion 22, for instance when the roll shell 10 is moved away from the mating roll 17. In FIG. 2, drive shaft 42 and toothed disk 43 have been omitted for the sake of clarity. Drive pinion 22 is mounted in gear housing 23 by means of two bearings 31 disposed at opposite ends of the pinion teeth. For axial securement of bearings 31, bearing cap 32 is provided on one side and ring 33 on the other side. Ring 33 also serves as a support for sealing ring 34.

Sealing ring 27 within rear housing disk 25 is used for sealing in the region of outer gear rim 21. Rotating slide ring 28, fastened to extension ring 11, is slidingly engaged by sealing ring 27. Because of the relatively steep inward taper for extension ring 11 relative to the outside diameter of roll shell 10, the diameter of the slide interface between slide ring 28 and sealing ring 27 can be made relatively small.

Slide plane 29, normal to the rotational axis of shell 10, is formed on the front surface of front housing disk 24. In the region of slide surface 29, support pedestal 14 is provided with annular groove 35 which is open axially towards gear housing 23 and is arranged substantially concentric to yoke 12. A portion of sealing ring 36 extends into annular groove 35 and is biased outwardly (to the left in FIG. 1) by means of springs 37 against slide surface 29 of gear housing 23. Seal support ring 44, concentric with yoke 12, mounts sealing ring 45 at the front side of support pedestal 14. Sealing ring 45 engages the outside of yoke 12 at the reduced diameter portion thereof to the right of bearing 13.

In the embodiment illustrated, the axis of pinion 22 lies in press plane 3. For this position of pinion 22, it is advisable to utilize gear housing part 23' (FIG. 2) which surrounds the drive pinion 22 as a torque support. For this purpose, housing part 23' extends on both sides of press plane 3 against respective stops 39 on support pedestal 14. Upon the displacement of the roll shell 10 along the press plane e, housing part 23' slides along the stops 39.

It should now be apparent to those skilled in the art that bearing sections 30 which support gear housing 23 on roll shell 10 can be developed as plain bearings or as anti-friction bearings of any desired construction, with the shape of the gear housing 23 being adapted to the type of bearing selected.

It should also be apparent to those skilled in the art that in the embodiment illustrated, all gear bearings, and particularly bearings 31, 31 for drive pinion 22, are loaded as uniformly as possible. This is of particular importance when vibrations occur on press roll 17.

Although the present invention has been described in connection with a preferred embodiment thereof, many variations will now become apparent to those skilled in the art. It is preferred, therefore, that the present invention be limited not by the specific disclosure herein, but only by the appended claims.

What is claimed is:

1. A press roll with adjustable sag comprising:
    an elongated rotatable hollow roll shell, a relatively stationary yoke extending axially through said roll shell, and a hydraulic support device for transmitting a pressing force from the yoke to the roll shell in a press plane;
    an outer gear rim secured to one end of the roll shell in a position concentric therewith, and a drive pinion having gear teeth in driving mesh with gear teeth on said outer gear rim;
    a gear housing which surrounds the pinion and the outer gear rim, and support bearings within said housing rotatably mounting the housing on the roll shell;
    a support disk interposed between the outer gear rim and the roll shell, and being positioned substantially centrally relative to the length of the teeth on the outer gear rim;
    said support bearings being disposed radially within the outer gear rim and on both sides of the support disk.

2. A press roll according to claim 1, also comprising:
    an extension tube interposed between the outer gear rim and the roll shell;
    the outside diameter of the outer gear rim being smaller than the diameter of the roll shell; and
    the distance from the axis of rotation of the roll shell to the outside of the part of the gear housing which surrounds the outer gear rim being less than one-half the outside diameter of the roll shell.

3. A press roll according to claim 1, in which the gear housing is provided on at least one side of the outer gear rim with a tubular collar piece; said support bearings being on the outside of said collar piece.

4. A press roll according to claim 3, also comprising a support pedestal on which the yoke rests; an axially yieldable sealing ring extending between the support pedestal and the gear housing; said sealing ring permitting substantial radial displacement of the gear housing relative to the support pedestal.

5. A press roll according to claim 1, also comprising a support pedestal on which the yoke rests; an axially yieldable sealing ring extending between the support pedestal and the gear housing; said sealing ring permitting substantial radial displacement of the gear housing relative to the support pedestal.

6. A press roll according to claim 5, in which the support pedestal includes an annular groove which is open in one axial direction towards the gear housing and from which the sealing ring projects axially.

7. A press roll according to claim 6, also comprising at least one fixed stop surface which constitutes a torque support that is engaged by a portion of the gear housing which surrounds the drive pinion.

8. A press roll according to claim 1, also comprising at least one fixed stop surface which costitutes a torque support that is engaged by a portion of the gear housing which surrounds the drive pinion.

9. A press roll according to claim 8, in which the stop surface is positioned axially approximately at a transverse plane located midway between the ends of the pinion teeth.

10. A press roll according to claim 9, in which the drive pinion rotates about an axis that is disposed approximately at the press plane.

11. A press roll according to claim 8, in which the drive pinion rotates about an axis that is disposed approximately at the press plane.

12. A press roll according to claim 11, also including a drive element through which the drive pinion is driven, said drive pinion having a concentric bore within which an articulated joint coupling is disposed; said coupling connecting the drive pinion to the drive element.

13. A press roll according to claim 1, also including a drive element by which the drive pinion is driven, said drive pinion having a concentric bore within which an articulated joint coupling is disposed; said coupling connecting the drive pinion to the drive element.

14. A press roll according to claim 13, in which the articulated joint coupling is disposed in the region of the transverse plane.

15. A press roll according to claim 14, also comprising:
    an extension tube interposed between the outer gear rim and the roll shell;
    the outside diameter of the outer gear rim being smaller than the diameter of the roll shell; and
    the distance from the axis of rotation of the roll shell to the outside of the part of the gear housing which surrounds the outer gear rim being less than one-half the outside diameter of the roll shell.

16. A press roll according to claim 15, in which the gear housing is provided on at least one side of the outer gear rim with a tubular collar piece; said support bearing being on the outside of said collar piece.

17. A press roll according to claim 16, also comprising a support pedestal on which the yoke rests; an axially yieldable sealing ring extending between the support pedestal and the gear housing; said sealing ring permitting substantial radial displacement of the gear housing relative to the support pedestal.

18. A press roll according to claim 17, in which the support pedestal includes an annular groove which is open in one axial direction towards the gear housing and from which the sealing ring projects axially.

19. A press roll according to claim 18, also comprising at least one fixed stop surface which constitutes a torque support that is engaged by a portion of the gear housing which surrounds the drive pinion.

20. A press roll according to claim 19, in which the stop surface is positioned axially approximately at a transverse plane located midway between the ends of the pinion teeth.

* * * * *